United States Patent [19]

Haynes

[11] 4,204,758
[45] May 27, 1980

[54] CLOSURE MECHANISM SUCH AS A CAMERA SHUTTER

[75] Inventor: Keith A. F. Haynes, Watford, England

[73] Assignee: John Hadland (Photograph Instrumentation) Ltd., Hertfordshire, England

[21] Appl. No.: 962,035

[22] Filed: Nov. 20, 1978

[51] Int. Cl.² .................... G03B 19/12; G03B 9/08
[52] U.S. Cl. .................... 354/152; 354/203; 254/226
[58] Field of Search .................... 354/152–158, 354/226, 250, 203

[56] References Cited

U.S. PATENT DOCUMENTS

| | | | |
|---|---|---|---|
| 1,827,464 | 10/1931 | Denniss et al. | 354/203 X |
| 1,829,332 | 10/1931 | Beck | 354/203 |
| 1,997,130 | 4/1935 | Weisse | 354/152 |
| 3,654,844 | 4/1972 | Hampton | 354/152 X |
| 3,785,270 | 1/1974 | Schiff et al. | 354/156 X |

FOREIGN PATENT DOCUMENTS

| | | | |
|---|---|---|---|
| 117721 | 11/1943 | Australia | 354/250 |
| 164468 | 4/1949 | Austria | 354/152 |
| 726693 | 9/1942 | Fed. Rep. of Germany | 354/152 |

Primary Examiner—L. T. Hix
Assistant Examiner—Shelley Wade
Attorney, Agent, or Firm—Wenderoth, Lind & Ponack

[57] ABSTRACT

A closure mechanism, such as a shutter in a camera, includes a closure member having an arcuate portion arranged to roll on a support member to cause a part of the closure member to move across an aperture thereby providing a movable barrier permitting selective communication of the aperture with spaces on opposite sides of the closure member. When used in a camera, the closure member is accommodated in an enclosure of which one wall includes the aperture, which may be a fibre optic plate. The closure member is movable between two extreme positions; in one position a mirror carried by the closure member optically couples the aperture with a viewing system and in the other position it blocks the viewing system while a film is located adjacent the aperture by a mechanism actuated in synchronism with the closure member.

18 Claims, 3 Drawing Figures

CLOSURE MECHANISM SUCH AS A CAMERA SHUTTER

BACKGROUND AND SUMMARY OF THE INVENTION

This invention relates to a closure mechanism and more particularly, but not exclusively to a shutter mechanism for a camera.

According to the present invention there is provided a closure mechanism in which a closure member is mounted for movement relative to an aperture and in which means are provided for moving the closure member to cause it to roll on a support member thereby to cause a part of the closure member to move across the aperture to form a movable barrier providing selective communication of the aperture with spaces on opposite sides of the closure member.

Preferably, the closure member has an arcuate portion with a generally curved face, which rolls on a generally flat, face of a support portion of the support member. Where the curved face is generally part cylindrical, the said part of the closure member is at the axis thereof and moves across the aperture in a straight path extending substantially transverse that axis.

The closure member may comprise a part-cylindrical portion and a substantially flat portion extending radially from an edge of the cylindrical portion to the axis thereof, where means are provided to form a seal between the closure member and a flat surface of, or surrounding the aperture.

The closure member may be a shutter in a camera, the aperture comprising an optical element, for instance a fibre optic face plate, through which images may be transmitted. On one side of the shutter may be a viewing system for viewing the image passing through the optical element and on the other side may be a film locating and transport system, the shutter being mounted in an enclosure which is open on opposing sides to said viewing, and said film locating and transport systems. To provide positive engagement for proper rolling of the shutter in the enclosure without slip between the shutter and the support member, the curved surface of the former may be provided with elongate axially extending teeth which mesh with teeth provided on an inner surface of a wall of the enclosure, this wall constituting the support member. The flat portion of the shutter is preferably provided with a mirror which forms part of the viewing system and which in one extreme position of the shutter lies on and oblique to the optical axis through the optical element thereby to reflect light passing therethrough to the other elements of the viewing system.

BRIEF DESCRIPTION OF THE DRAWINGS

An embodiment of the invention will now be described by way of example with reference to the accompanying drawings in which.

DETAILED DESCRIPTION OF THE INVENTION

Figure 1:
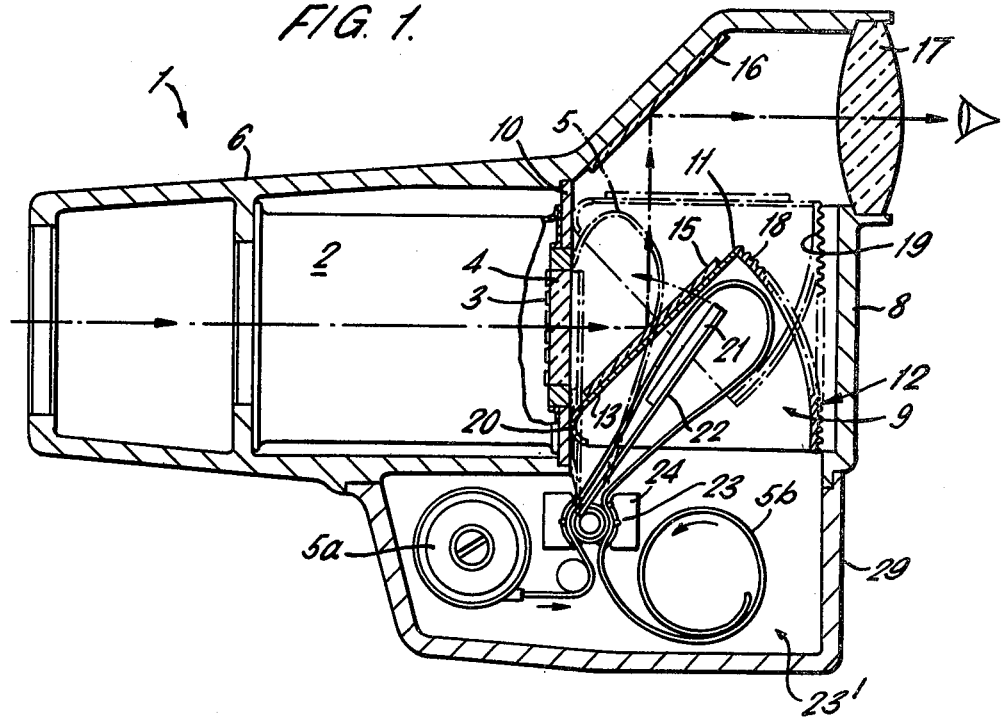
FIG. 1 is an elevational section through a camera having a shutter mechanism according to the invention.

The camera 1 illustrated is a low light camera including an image intensifier tube 2 which has at its rear end a phosphor screen 3 which converts an electron beam impinging thereon to an optical image and a fibre optic face plate 4, which transfers the image to a photo-sensitive recording member, in this case a film 5, when held against a rear surface thereof. It will be appreciated that this is a very particular type of camera for specialised use and that the shutter mechanism to be described may be used not only in many other types of camera, but also, with appropriate modification in numerous applications, unrelated to photography, low light or otherwise, where it is necessary to provide a selectively operable barrier.

The following description is confined to the elements forming the rear part of the camera, i.e. behind the fibre optic face plate 4, since the remaining elements of the camera do not form part of the present invention.

The camera has a camera housing 6 with side walls 7 and 7' and a rear wall 8 which define three sides of an enclosure 9 behind the face plate 4. This plate is mounted in a light tight partition 10 which defines a fourth side of the enclosure. The enclosure is open both at its top and bottom, and accommodates a closure element comprising a shutter 11 having a generally part-cylindrical arcuate portion 12 and integrally formed therewith a flat portion 13 which extends radially to the axis of the arcuate portion. The shutter thus resembles a sector of a cylinder, (and when viewed end-on as in FIG. 1 appears part circular) the axis of which extends normal to the plane on which FIG. 1 is a section, and a pair of sector-shaped side walls 14 each adjoin a respective side edge of the flat portion 13 and a respective end of the arcuate portion 12.

The shutter is so arranged as to be capable of moving vertically in the enclosure 9 with its arcuate portion rolling on the inner face of the rear wall 8, which is parallel to, and on the opposite side of the enclosure to the faceplate 4. In the plane of FIG. 1, which is parallel to the direction in which the shutter 11 rolls, and extends through the arcuate portion 12 and the rear wall 8, the said rear wall is substantially straight. The flat portion 13 carries on its outer surface a thin mirror 15 which, in the lowermost position of the shutter (as illustrated in full line in FIG. 1) forms the lower element of a periscopic viewing system which also includes a fixed mirror 16 and a viewing lens 17.

In this embodiment the arcuate portion 12 is provided on its outer generally cylindrical face with elongate axially extending teeth 18 so as to form part of a gear wheel, and the inside face of the rearwall 8 is similarly toothed to form a toothed rack 19 which constitutes a support member for the shutter, and which the teeth 18 of the shutter engage. Thus, if the apex end of the shutter is moved vertically in a straight line, the part cylindrical end will roll in positive engagement with the rack 19, causing the mirror 15 to be moved from its normal attitude of 45° to the horizontal to an approximately horizontal attitude at an upper position of the shutter (as illustrated in broken lines in FIG. 1). In this upper position, the shutter closes the top of the enclosure 9 and presents an optical barrier in the periscopic system.

Pieces of smooth felt 20 are fixed to the apex edge of the flat portion 13, and the side walls 14 of the shutter. These, together with the full width gear teeth on the arcuate portion 12 acting as a light-baffling labyrinth, achieve light tightness around the shutter to prevent ambient light, which can enter through the viewing system above the shutter, from reaching the interior of the camera, below the shutter where the film and the film transport system are located.

As is evident from FIG. 1, the apex of the shutter will always extend fully from the rearwall 8 on which it rolls to the faceplate 4. Thus, the required light-sealing is maintained with constant pressure on the sealing material 20 at the apex end.

A pressure pad 21 is provided to apply the film against the rear surface of the faceplate 4 when the shutter is in its uppermost position, and means are provided to move this pad rearwardly away from the faceplate after exposure to allow full descent of the shutter to restore the viewing condition. In the present embodiment, the pad is mounted on an arm 22 pivoted on the axis of a film-feed sprocket 23 of a film transport system, and lies in the arcuate space within the shutter in the lowermost position of the latter, having been previously pivoted clockwise from a substantially vertical orientation maintained during exposure.

In order to present the film emulsion to the faceplate 4, and at the same time to minimise the mechanical load (and its effect, therefore, on the speed of operation of the camera), the film 5 is fed from a supply cassette 5a in a free-loop of constant length, and of low inertia, about the single film drive-sprocket 23, with its emulsion face outwards. Means of ensuring consistency of loop-size is provided as a loading aid. A variety of established means may be used to maintain the film in driving contact with either side of the sprocket, one such means being illustrated schematically at 24 in FIG. 1. The exposed film is in this embodiment, advanced into a space 23' behind the sprocket 23 where it forms a free roll 5b. It will be appreciated that other methods of take-up and/or storage may be used. Within the loop of film is situated the self-aligning pressure pad 21, which, at the appropriate time, carries the film loop towards the faceplate 4, and holds it in intimate contact during the period of image exposure; the image may be produced for the required duration by an electronic pulsing technique described in British Patent Applications Nos. 39498/74 and 51775/74. The pulse is initiated by the shutter reaching its upper limit of travel.

Figure 2:
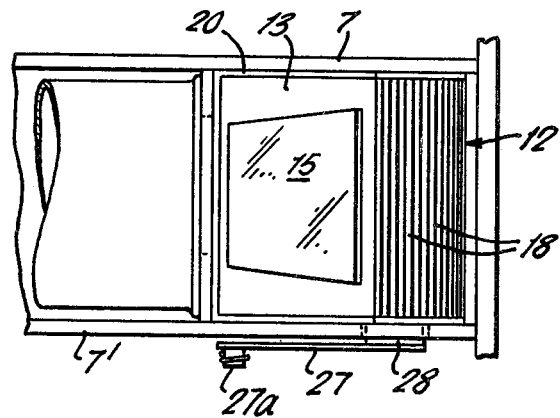
FIG. 2 is a plan view of part of the camera of FIG. 1.
Figure 3:
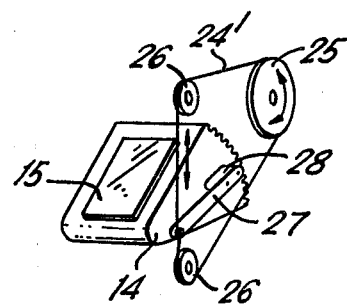
FIG. 3 illustrates an arrangement for operating the shutter mechanism of the camera.

The pressure-pad 21 is carried on a very light supporting frame, including the arm 22, which frame is in this embodiment directly linked with the sector shutter by conventional mechanical means, so as to obtain a correct timing relationship between shutter and pad movement. Means for operating the shutter may include a cord and pulley drive system illustrated in FIGS. 2 and 3, by which a continuous cord 24', reversibly driven by a drive pulley 25 is connected between a pair of idler pulleys 26 to a drive arm 27 by way of a cylindrical pin 27a, around which the cord takes a full turn, this pin being mounted coaxially with the apex of the shutter at one end of the arm, and the arm being firmly attached at its other end to one side wall of the shutter by way of a spacer bracket 28. The bracket 28 projects through the sidewall 7', so that the drive system may be operatively disposed outside the light-tight enclosure 9.

The film transport system and pressure pad assembly are mounted on an access door 29 which is completely detachable from the camera housing 6 for convenience of film loading.

In the present embodiment the camera is motor driven, having a suitable gearing system to time the sequence of operations correctly. A complete operating cycle for the exposure of the film to an image will now be described.

Initially, the components of the shutter and film transport system are at rest in relative positions as illustrated in full lines in FIG. 1, the shutter being in its lowermost position, and a steady image being viewed through the periscopic system. The shutter 11 then commences its upward movement, causing the steady image displayed on the phosphor screen 3 to be switched off. Simultaneously, the pressure pad 21 moves towards the faceplate 4 carrying with it the film 5. When the shutter reaches its uppermost position, the pressure pad is in its operative position, pressing the film against the faceplate, and the viewing system is blocked. An image of required duration is obtained by pulsing the intensifier tube and exposed onto the film. The shutter then descends to the lowermost position restoring the steady image-viewing condition, and the pressure pad is moved away from the faceplate carrying the film loop with it. The film is advanced by one frame; this advancing step can be timed to commence as soon as the pressure pad has moved the film clear of the faceplate.

To rewind the exposed film, the sprocket 23 is disengaged from its drive and the cassette 5a is rewound in the normal way, and removed after releasing the access door 29.

The camera may be designed for automatic repetitive exposure, and in the present embodiment if the operating button is held down, the camera exposes 35 mm film frames continuously at the rate of 60 per minute.

I claim:

1. A closure mechanism comprising a closure member including an arcuate portion and mounted for movement relative to an aperture, and means for moving said closure member to cause said arcuate portion to roll on a straight support portion of a support member and to thereby cause a part of said closure member to move across the aperture in a substantially straight path to provide selective comunication of the aperture with spaces on opposite sides of said closure member while also providing a permanent barrier preventing communication between said spaces.

2. A closure mechanism according to claim 1 wherein the said arcuate portion has a face which is generally circular, and wherein said part of said closure member is at the axis of said face so as to move across said aperture in said straight path extending substantially transverse that axis.

3. A closure mechanism according to claim 2, wherein said face is generally part-cylindrical, and wherein said support portion comprises a generally planar face on which said generally part-cylindrical face rolls.

4. A closure mechanism according to claim 1, wherein said arcuate portion of said closure member and said support portion of said support member, which contact each other during rolling of said closure member, are provided with mutually engageable teeth to avoid slip between said closure member and said support member.

5. A closure mechanism according to claim 1, wherein said means for moving comprise a drive assembly arranged to apply motive force to said closure member at a point on or adjacent said path.

6. A camera comprising a shutter assembly including a shutter member arranged to provide controlled exposure of a photosensitive element, when loaded in the camera, to light passing through an aperture, said shutter member being mounted for movement relative to the aperture, means for moving said shutter member, and said shutter member having an arcuate portion arranged to roll on a straight support portion of a support member to cause a part of said shutter member to move across the aperture in a substantially straight path to permit optical communication of the aperture selectively with spaces on opposite sides of said shutter member while providing a permanent light barrier between said spaces.

7. A camera according to claim 6, further comprising an image viewing system arranged on one side of said shutter member, and a system for locating the photosensitive element on the other side of said shutter member, said shutter member being adapted to roll between first and second positions, in which, respectively, said shutter member provides optical coupling between said aperture and said viewing system, to permit viewing of an image formed by light entering said aperture, and said locating system permits said exposure of said photosensitive element, when in use, to said image, said shutter member providing a permanent barrier to the passage of light from said viewing system to said locating system.

8. A camera according to claim 7, wherein said shutter member is mounted in an enclosure which is open on two opposing sides and wherein at least part of said viewing and said locating systems are arranged outwardly of said opposing sides of said enclosure.

9. A camera according to claim 7 or claim 8, wherein said shutter member carries a mirror which forms part of said viewing system and which in said first position of said shutter member is disposed to face said aperture and to reflect light passing through the aperture toward further elements of the viewing system.

10. A camera according to claim 6 wherein said aperture comprises a solid optical element.

11. A camera according to claim 10, wherein said optical element is a fibre optic faceplate having a substantially flat surface across which said part of said shutter member will move.

12. A camera according to claim 7, wherein the locating system is adapted for locating and advancing elongate photosensitive film.

13. A camera according to claim 12, wherein said film locating system includes a moveably mounted pressure pad and is operable in synchronism with said shutter member such that when said shutter member moves from said first position towards said second position said pressure pad is moved toward an operative position in which it will locate a portion of said film adjacent said aperture.

14. A camera according to claim 13, wherein said pressure pad is mounted on an arm which is pivotable about the axis of a film feed sprocket, and wherein the arrangement is such that said arm is pivoted in one sense to move said pressure pad toward said aperture when said shutter member moves from said first toward said second position, and is pivoted in the opposite sense to move said pressure pad away from said aperture when the shutter member moves from said second position toward said first position.

15. A camera according to claim 14, including a removable film carrier including said film feed sprocket and pivotal arm, and adapted to feed said film in a free loop of substantially constant length about said film feed sprocket with said arm disposed within said loop.

16. A camera according to claim 6, wherein means are provided at said part of said shutter to form an optical seal between said shutter member and a flat surface of or surrounding said aperture.

17. A camera according to claim 8, wherein said arcuate portion has a generally part-cylindrical face, a wall of said enclosure constitutes said support member and has a generally planar face upon which said generally part-cylindrical face rolls, and said part of said shutter member is at the axis of said part-cylindrical face so as to move across said aperture along said straight path, said generally part-cylindrical face and said generally planar face being provided with mutually engageable teeth to inhibit slip between said shutter member and said support member, said teeth of said generally part-cylindrical face of said shutter member comprising elongate teeth which extend parallel to the axis of the said face and which mesh with teeth provided on an inner surface of said wall of said enclosure.

18. A camera comprising a system for projecting an image through an aperture, an image viewing system to permit viewing of said image, a film locating system for positioning a film for exposure to said image, and a shutter mechanism including a support member fixed relative to said aperture and a shutter member mounted for movement relative to said aperture, said shutter member having an arcuate portion arranged to roll on a straight support portion of said support member to cause a part of said shutter member to move across said aperture in a substantially straight path to provide communication of said aperture selectively with said viewing system or said film locating system while providing a permanent light barrier between said viewing and film locating systems.

* * * * *